(12) United States Patent
Spisic et al.

(10) Patent No.: US 11,494,353 B2
(45) Date of Patent: *Nov. 8, 2022

(54) DETECTING INTERESTING DECISION RULES IN TREE ENSEMBLES

(71) Applicant: International Business Machines Corporation, Armonk, NY (US)

(72) Inventors: Damir Spisic, Chicago, IL (US); Jing Xu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 586 days.

This patent is subject to a terminal disclaimer.

(21) Appl. No.: 16/547,987

(22) Filed: Aug. 22, 2019

(65) Prior Publication Data
US 2019/0377719 A1     Dec. 12, 2019

Related U.S. Application Data

(63) Continuation of application No. 14/852,826, filed on Sep. 14, 2015, now Pat. No. 10,394,779.

(51) Int. Cl.
*G06N 20/00*     (2019.01)
*G06N 5/02*      (2006.01)
(Continued)

(52) U.S. Cl.
CPC .... *G06F 16/2246* (2019.01); *G06F 16/24578* (2019.01); *G06N 5/025* (2013.01);
(Continued)

(58) Field of Classification Search
None
See application file for complete search history.

(56) References Cited

U.S. PATENT DOCUMENTS 6,651,049 B1     11/2003 Argawal et al.
2006/0242139 A1  10/2006 Butterfield et al.
(Continued)

OTHER PUBLICATIONS

List of IBM Patents or Applications Treated as Related, Feb. 4, 2020, 2 pages.
(Continued)

*Primary Examiner* — Daniel T Pellett
(74) *Attorney, Agent, or Firm* — Stephen J. Walder, Jr.; Steven Bouknight

(57) ABSTRACT

Mechanisms are provided for detecting interesting decision rules from a set of decision rules in a tree ensemble. Each tree in the tree ensemble is traversed in order to assign each individual data record from a set of data records to an identified leaf node in each tree. Predicted values are determined for the tree ensemble based on predictions provided by each leaf node to which each individual data record is assigned. Interesting sub-indices for decision rules from the set of decision rules are determined and, for each decision rule corresponding to the leaf nodes in the tree ensemble, the sub-indices are combined into interestingness index $I_t$. The decision rules are ranked corresponding to the leaf nodes in the tree ensemble according to the associated value of the interestingness index $I_t$ and a subset of the decision rules corresponding to the leaf nodes in the tree ensemble are reported.

10 Claims, 9 Drawing Sheets

(51) Int. Cl.
    *G06N 20/20*     (2019.01)
    *G06N 5/04*     (2006.01)
    *G06F 16/22*     (2019.01)
    *G06F 16/2457*     (2019.01)

(52) U.S. Cl.
    CPC ............ *G06N 5/046* (2013.01); *G06N 20/00* (2019.01); *G06N 20/20* (2019.01)

(56) References Cited

U.S. PATENT DOCUMENTS

| | | |
|---|---|---|
| 2014/0114707 A1 | 4/2014 | Rope et al. |
| 2015/0032680 A1 | 1/2015 | Cichosz et al. |
| 2015/0039624 A1 | 2/2015 | Chu et al. |
| 2015/0286707 A1 | 10/2015 | Levitan et al. |

OTHER PUBLICATIONS

Liu, Bing et al., "Analyzing the Subjective Interestingness of Association Rules", IEEE Intelligent Systems and their Applications 15.5 (2000): Sep./Oct. 2000, pp. 47-55.

Liu, Sheng et al., "Learning accurate and interpretable models based on regularized random forests regression", IEEE International Conference on Bioinformatics and Biomedicine (BIBM 2013), Shanghai, China, Dec. 18-21, 2013, 9 pages.

Zimmermann, Albrecht, "Ensemble-Trees: Leveraging Ensemble Power inside Decision Trees", International Conference on Discovery Science. Springer, Berlin, Heidelberg, Oct. 2008, 12 pages.

DETECTING INTERESTING DECISION RULES IN TREE ENSEMBLES

BACKGROUND

The present application relates generally to an improved data processing apparatus and method and more specifically to mechanisms for detecting interesting decision rules in tree ensembles.

Supervised learning algorithms are commonly described as performing the task of searching through a hypothesis space to find a suitable hypothesis that will make good predictions with regard to a particular problem. Even if the hypothesis space contains hypotheses that are very well-suited for a particular problem, it may be very difficult to find a good one. Ensembles combine multiple hypotheses to form a (hopefully) better hypothesis. The term ensemble is usually reserved for methods that generate multiple hypotheses using the same base learner.

Evaluating the prediction of an ensemble typically requires more determination than evaluating the prediction of a single model, so ensembles may be thought of as a way to compensate for poor learning algorithms by performing a lot of extra determination. Fast algorithms, such as decision trees, are commonly used with ensembles, although slower algorithms can benefit from ensemble techniques as well.

Therefore, tree ensembles are among the most popular and successful machine learning models. Tree ensembles combine predicted values from each tree within the ensemble by voting for categorical targets and by averaging for continuous targets. Different trees in an ensemble are usually generated using bagging, random forests, or boosting methods. Bagging is based on re-sampling data records from training data set, random forests are based on re-sampling both data records and attributes, while boosting is based on dynamically changing the record weights for generating each tree model. These and other similar tree ensemble methods improve model accuracy by reducing the prediction variance inherent to single tree models.

Tree models generate a number of decision rules that are easy to understand and apply. They often provide direct insights into important relationships. Unfortunately, the ease of interpretation for a single tree is lost when they are combined into an ensemble. Tree ensembles are usually more accurate than a single tree, but are very non-transparent from the user perspective. They offer no interpretable insights into important relationships supported by the data.

SUMMARY

In one illustrative embodiment, a method, in a data processing system, is provided for detecting interesting decision rules from a set of decision rules in a tree ensemble. The illustrative embodiment traverses each tree in the tree ensemble in order to assign each individual data record from a set of data records in an evaluation data set to an identified leaf node in a set of leaf nodes in each tree. The illustrative embodiment determines predicted values defined by the tree ensemble based on predictions provided by each leaf node to which each individual data record is assigned. The illustrative embodiment determines interesting sub-indices for decision rules from the set of decision rules corresponding to the leaf nodes in the tree ensemble. For each decision rule corresponding to the leaf nodes in the tree ensemble, the illustrative embodiment combines the sub-indices into interestingness index $I_t$. The illustrative embodiment ranks the decision rules corresponding to the leaf nodes in the tree ensemble according to the associated value of the interestingness index $I_t$. The illustrative embodiment reports a subset of the decision rules corresponding to the leaf nodes in the tree ensemble in order to provide a notification of the interesting decision rules in the tree ensemble.

Thus, the illustrative embodiments provide for detecting interesting decision rules in tree ensembles that conform to the ensemble predictions, where ensemble predictions are accurate. Interestingness is considered to be high prediction accuracy for categorical targets and high difference from the overall average for continuous targets. Candidate decision rules are based on the leaf nodes of generated trees in the ensemble and novel metrics are provided that combine interestingness and conformance with ensemble predictions. The top decision rules ranked by the computed metrics are the most interesting rules that are consistent with the ensemble predictions.

Thus, in the illustrative embodiment, the subset of the decision rules corresponding to the leaf nodes in the tree ensemble is at least one of a predetermined number of decision rules, a percentage of the total number of decision rules, or decision rules whose interestingness index $I_t$ is above a predetermined threshold Further, each decision rule in the set of decision rules comprise at least one of variables, constraints, and the predicted target value on a path to the corresponding leaf node.

Additionally, the illustrative embodiment determines the interesting sub-indices for decision rules corresponding to the leaf nodes in the tree ensemble are performed for categorical targets or continuous targets. In determining the interesting sub-indices for decision rules corresponding to the leaf nodes in the tree ensemble for categorical targets, the illustrative embodiment identifies a proportion of data records P(R(t)) determined by the leaf node I where the decision rule is accurate, R(t) being the event that the decision rule based on the node t is accurate. The illustrative embodiment identifies a proportion of data records P(E(t)) determined by the leaf node t where the tree ensemble model is accurate, E(t) being an event that the ensemble prediction is accurate based on a data record determined by node t. The illustrative embodiment determines a proportion P(E(t)) that the ensemble prediction is inaccurate based on a data record determined by node t by defining $P(\overline{E}(t))=1-P(E(t))$. The illustrative embodiment identifies a proportion of data records P(E(t)R(t)) determined by the node t that are predicted accurately by both the ensemble model and the decision rule. The illustrative embodiment identifies a proportion of data records $P(\overline{E}(t)\overline{R}(t))$ determined by the node t that are predicted inaccurately by both the ensemble model and the decision rule. The illustrative embodiment, then determines a first sub-index of interestingness $I_1^t$ based on prediction agreement between the ensemble model and the decision rule as $I_1^t=P(E(t)R(t))+P(\overline{E}(t)\overline{R}(t))$, determines a second sub-index of interestingness $I_2^t$ on the decision rule accuracy as $I_2^t=P(R(t))$; and determines a third sub-index of interestingness $I_3^t$ on the ensemble model accuracy as $I_3^t=P(E(t))$.

In determining the interesting sub-indices for decision rules corresponding to the leaf nodes in the tree ensemble for continuous targets, the illustrative embodiment determines a standardized measure value D(t). The illustrative embodiment determines a first sub-index of interestingness $I_1^t$ between a decision rule and the ensemble prediction based on the conformance requirement as $I_1^t=1-D(t)$. The illustrative embodiment identifies decision rules that predict either high or low values of the target variable to be the most interesting. The illustrative embodiment determines an effect size measure corresponding to a t-test and transforms the effect size measure into an interestingness sub-index with values between 0 and 1. The illustrative embodiment defines a second sub-index of interestingness $I_2^t$ of the decision rule accuracy as:

$$I_2^t = \begin{cases} 0, & p_{vlaue}(t) \geq sig \\ f(E_s(t)), & p_{vlaue}(t) < sig \end{cases}$$

where sig is a specified significance level, $p_{value}(t)$ is a p-value from the t-test, $E_s(t)$ is the effect size measure, and $f(x)$ is a monotone cubic interpolation function. The illustrative embodiment determines an R squared metric for the ensemble model on data records determined by the leaf node t. The illustrative embodiment determines R squared as 1 minus the relative error, where the relative error is given by the sum of squared errors for the ensemble model divided by the total sum of squares. The illustrative embodiment then defines a third sub-index of interestingness $I_3^t$ for accuracy of the ensemble model prediction to be $I_3^t=R^2(t)$.

In both the categorical targets case or the continuous targets case, the illustrative embodiment identifies the interestingness index $I_t$ as a product of a first sub-index of interestingness $I_1^t$, a second sub-index of interestingness $I_2^t$, and a third sub-index of interestingness $I_3^t$. Thus, the illustrative embodiments provide mechanisms for detecting interesting decision rules in a tree ensemble though an interpretation of predictions from a tree ensemble using concrete decision rules. Rather than interpreting some typical results of the ensemble model, the mechanisms focus on extracting the most interesting rules that are valuable for users to learn. The wide variety of decision rules provided by the tree ensemble forms a foundation for such an interesting decision rules search.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will he described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
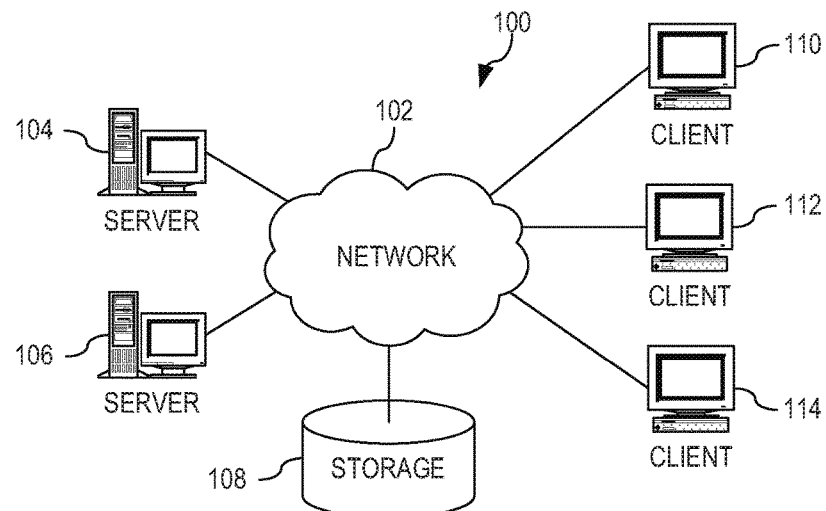
FIG. 1 is an example diagram of a distributed data processing system in which aspects of the illustrative embodiments may be implemented.

The illustrative embodiments provide mechanisms for detecting interesting decision rules in tree ensembles. As noted above, tree ensembles combine predicted values from each tree within the ensemble by voting for categorical targets and by averaging for continuous targets in order to improve model accuracy by reducing the prediction variance inherent to single tree models. Tree models generate a number of decision rules that are easy to understand and apply and often provide direct insights into important relationships. However, in order to interpret relationships supported by the data of tree ensembles, it is necessary to provide tools for interpreting interesting tree ensemble results. The illustrative embodiments provide for generation of most interesting rules that are consistent with the tree ensemble predictions and where ensemble predictions are the most accurate. Interesting rules for categorical targets are the ones with high accuracy. For continuous targets, the interesting rules are those that predict either high or low values.

That is, the mechanisms detect decision rules that are interesting, that conform to the ensemble predictions, and where ensemble predictions are accurate. Interestingness that we consider is high prediction accuracy for categorical targets and high difference from the overall average for continuous targets. Candidate decision rules are based on the leaf nodes of generated trees in the ensemble. Proposed are novel metrics that combine interestingness and conformance with ensemble predictions. The top decision rules ranked by the computed metrics are the most interesting rules that are consistent with the ensemble predictions.

Before beginning the discussion of the various aspects of the illustrative embodiments, it should first be appreciated that throughout, this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
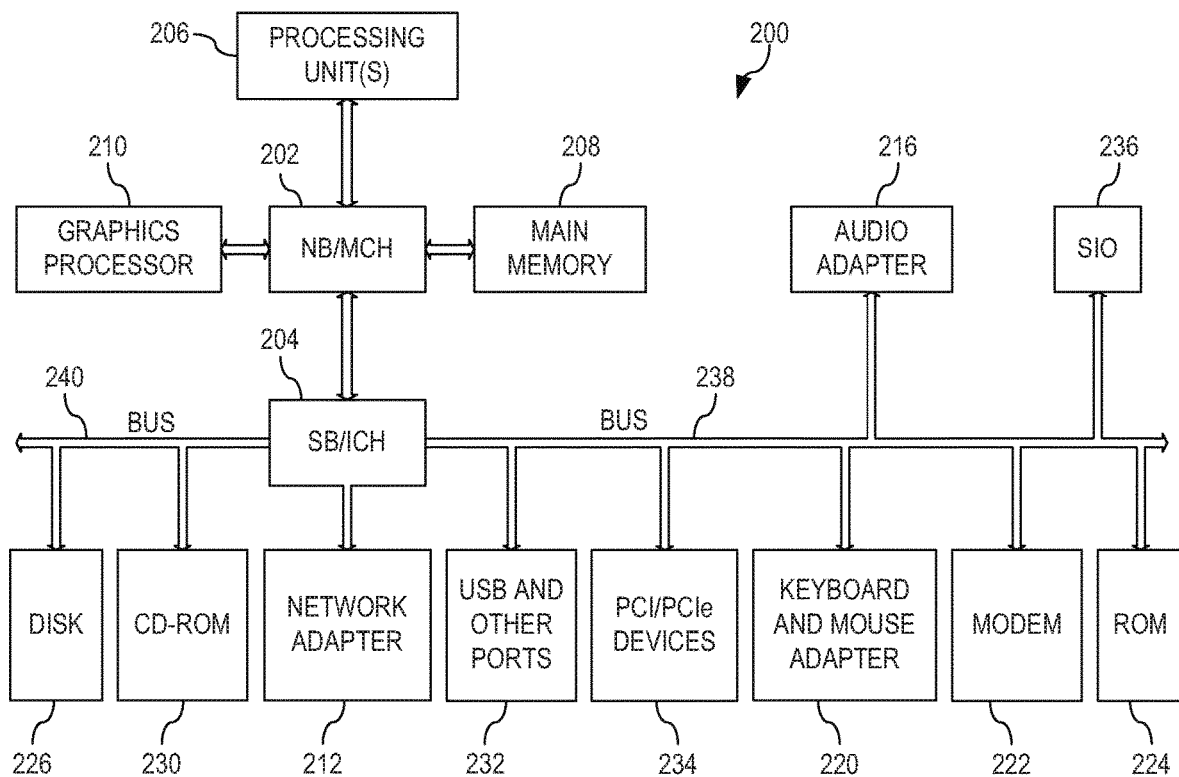
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for detecting interesting decision rules in tree ensembles. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

it should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates in detecting interesting decision rules in tree ensembles.

As noted above, the mechanisms of the illustrative embodiments utilize specifically configured computing devices, or data processing systems, to perform the operations for detecting interesting decision rules in tree ensembles. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller huh (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240, HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanisms for detecting interesting decision rules in tree ensembles.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As described above, the ensemble analysis technique may provide more accurate and stable predictions than a single classifier. On the other hand, an ensemble works as a black box, and the ensembles' predictions may be difficult, to interpret. Even when the involved base models are decision trees, the ensemble model may still be difficult to interpret. Thus, the illustrative embodiments provide mechanisms for detecting interesting decision rules in a tree ensemble though an interpretation of predictions from a tree ensemble using concrete decision rules. Rather than interpreting some typical results of the ensemble model, the mechanisms focus on extracting the most interesting rules that are valuable for users to learn. The wide variety of decision rules provided by the tree ensemble forms a foundation for such an interesting decision rules search.

Figure 3:
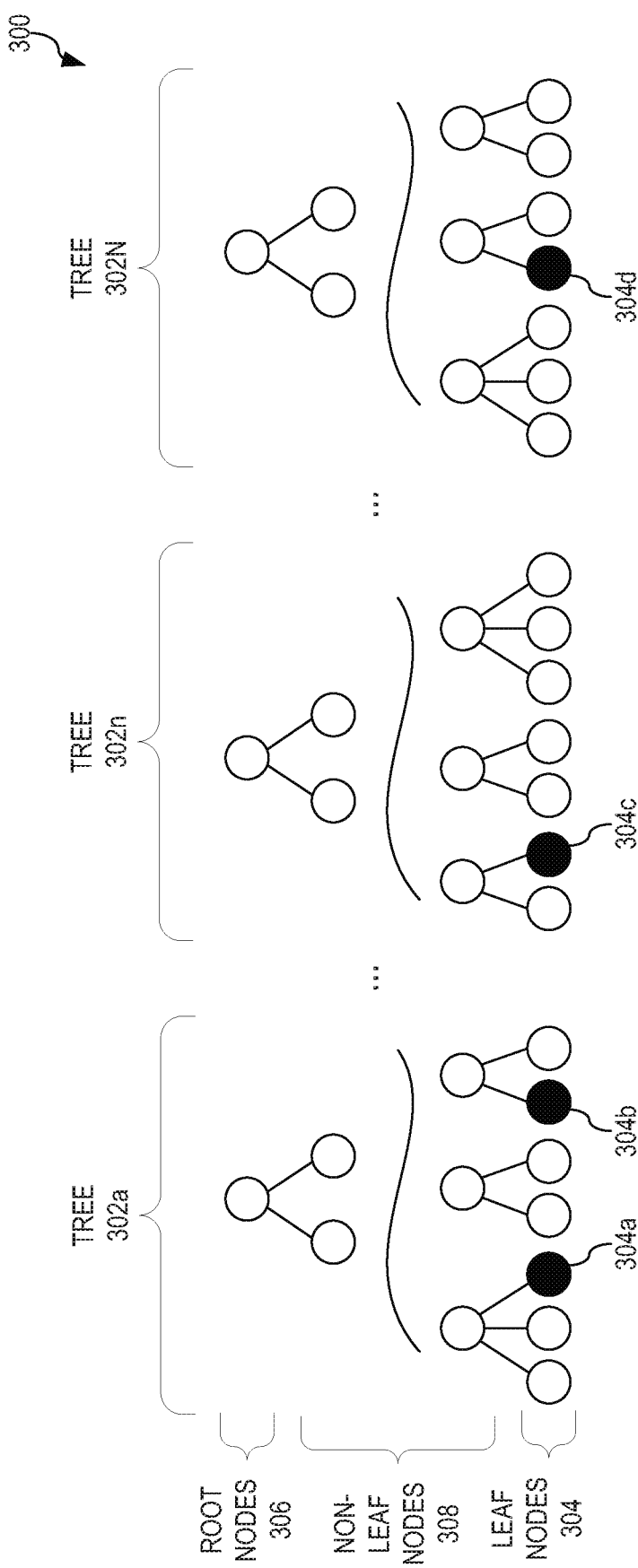
FIG. 3 depicts an exemplary tree ensemble model Where interesting decision rules corresponding to a subset of leaf nodes are marked according to their interestingness indexes in accordance with an illustrative embodiment.

FIG. 3 depicts an exemplary tree ensemble model where interesting decision rules corresponding to a subset of leaf nodes are marked according to their interestingness indexes in accordance with an illustrative embodiment. As is illustrated, a plurality of trees 302a, ..., 302n, ..., to 302N are selected for analysis thereby forming tree ensemble 300. Utilizing the mechanisms of the illustrative embodiments that detect interesting decision rules corresponding to one or more leaf nodes of the plurality of leaf nodes 304 emanating from root nodes 306 and non-leaf nodes 308 in tree ensemble 300, which is described in detail below, leaf nodes 304a, 304b, 304c, and 304d are identified as having decision rules that are the most interesting with regard to the most accurate and stable predictions that are provided by tree ensemble 300. That is, interesting decision rules based on leaf nodes 304a, 304b, 304c, and 304d are defined as those which have high prediction accuracy and also high agreement with the predictions of tree ensemble 300.

Figure 4:
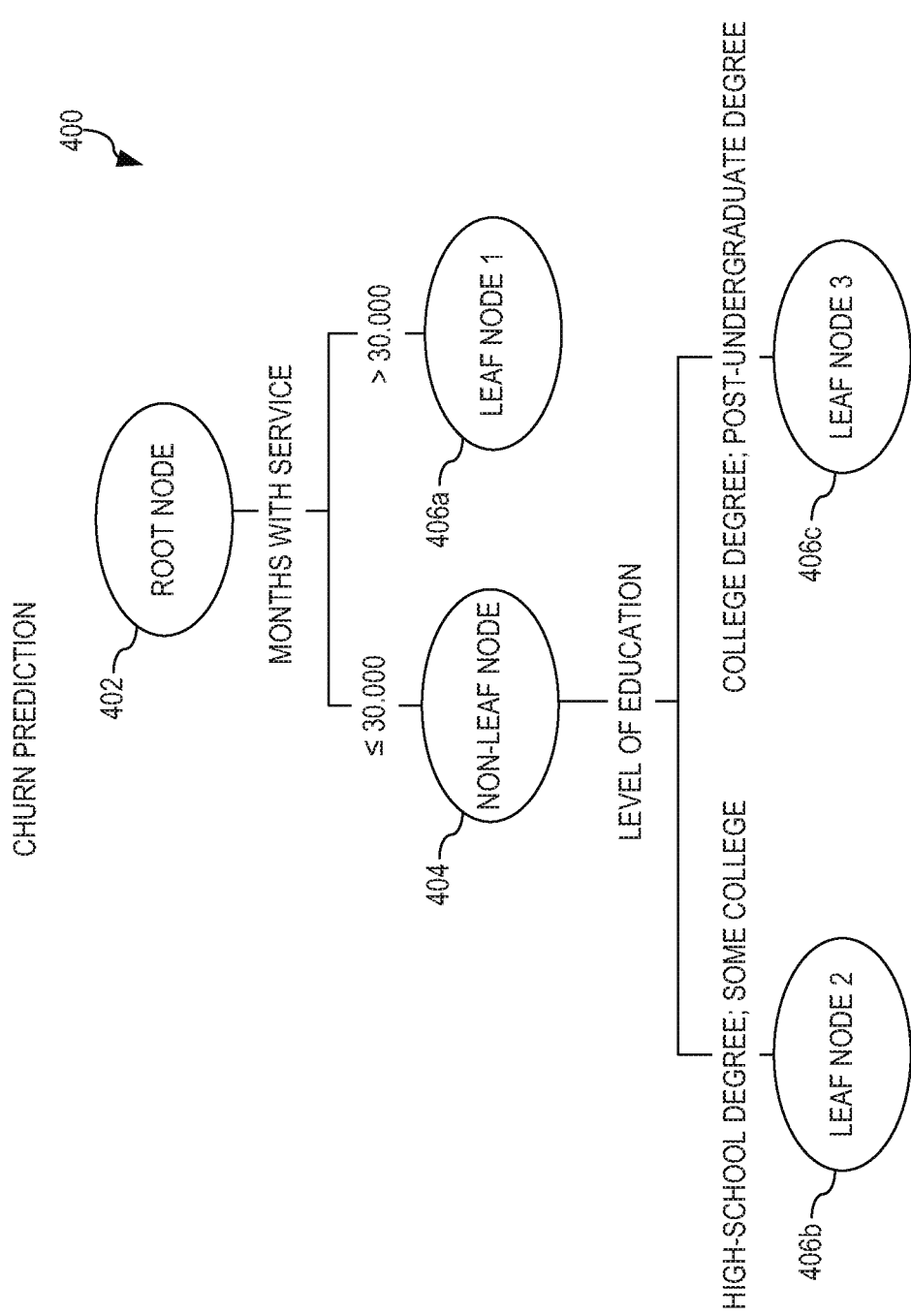
FIG. 4 depicts one example of a decision tree and decision rules in accordance with an illustrative embodiment.

FIG. 4 depicts one example of a decision tree and decision rules, such as one of decision trees 302, ..., 302n, ..., or 302N of FIG. 3, in accordance with an illustrative embodiment. As is illustrated, decision tree 400, which evaluates churn prediction, comprises root node 402, non-leaf node 404, and leaf nodes 406a, 406b, and 406c. As is further illustrated, each of leaf nodes 406a, 406b, and 406c in decision tree 400 defines a decision rule. For example, assume that proportion of 'churn' and 'not churn' data records in leaf node 406b are 0.627 (62.7%) and 0.373 (37.3%), respectively. Then the corresponding decision rule is given as follows:

IF ('Months with service'<=30.000) and ('Level of education'='High school degree' or 'Some college') THEN 'churn' with a probability of 0.627 (62.7%).

Figure 5:
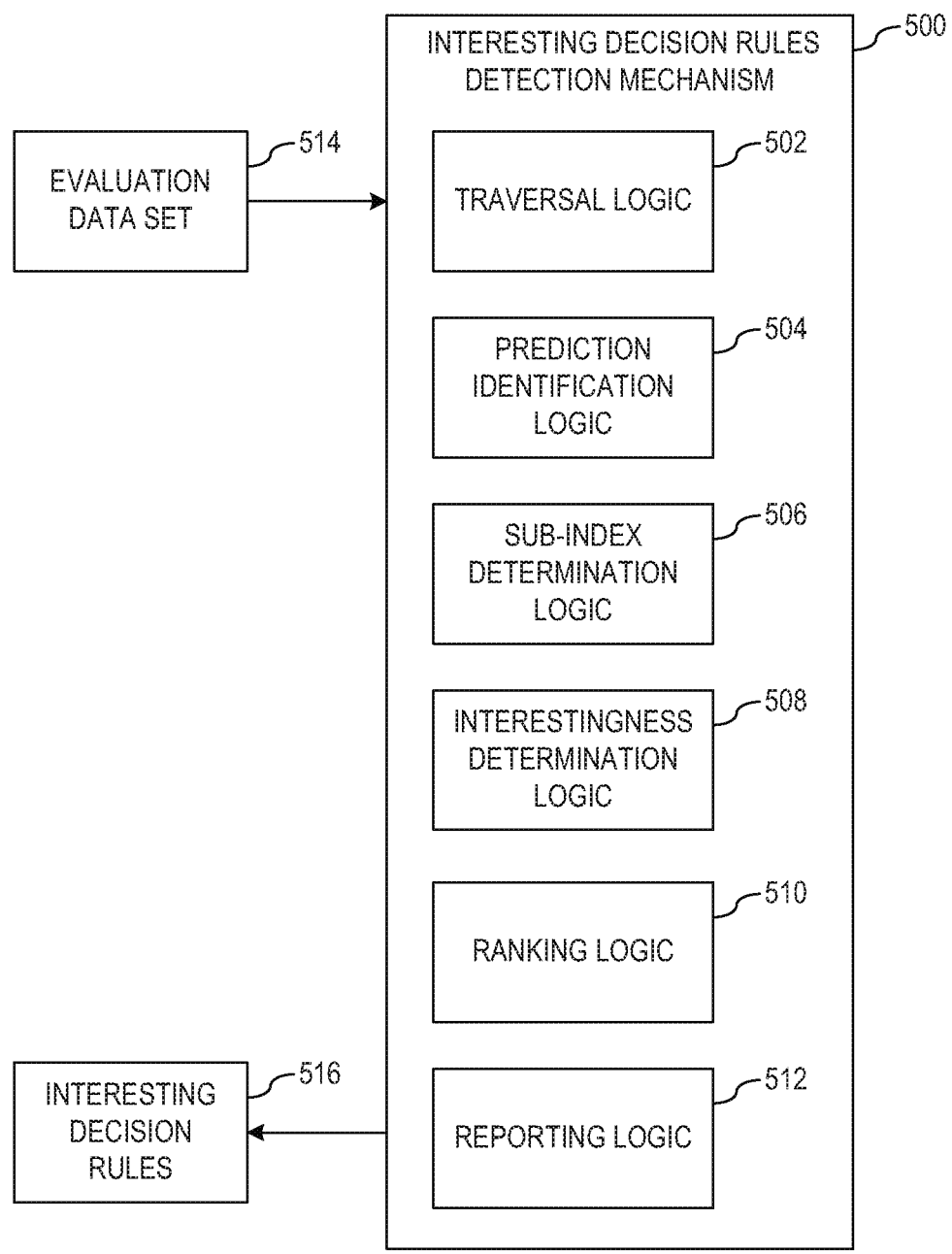
FIG. 5 depicts a function block diagram of a mechanism for detecting interesting decision rules from a tree ensemble in accordance with an illustrative embodiment.

FIG. 5 depicts a function block diagram of a mechanism for detecting interesting decision rules from a tree ensemble in accordance with an illustrative embodiment. Interesting decision rules detection mechanism 500 comprises traversal logic 502, prediction identification logic 504, sub-index determination logic 506, interestingness determination logic 508, ranking logic 510, and reporting logic 512. In order to detect interesting decision rules in a tree ensemble, traversal logic 502 uses evaluation data set 514 for assessing both the tree ensemble accuracy and detecting interesting decision rules identified by the leaf nodes of the tree ensemble. That is, traversal logic 502 uses evaluation data set 514 for evaluating each tree in the tree ensemble. During the process, traversal logic 502 selects a first tree in the tree ensemble and initially assigns each record in the evaluation data set 514 to the root node. Then, for each record in the evaluation data set 514, traversal logic 502 determines a leaf node in a set of leaf nodes in the first tree that the record should be assigned to. That is, in one embodiment, traversal logic 502 checks each leaf node and, if the record should be assigned to the leaf node, traversal logic 502 reassigns the record from the root node to the leaf node. In another embodiment, traversal logic 502 passes the record form the root node to a proper child node and then the child node to another child node or leaf node until a leaf node is reached. Once the record is assigned to a leaf node, traversal logic 502 repeats the process for each record in the evaluation data set 514. Once each record in the evaluation data set 514 has been analyzed and assigned to a leaf node, traversal logic 502 repeats the process thereby traversing each tree in the tree ensemble for the data records in the evaluation data set 514. A data record is a set of all values for a given object specified by the variables in the evaluation data set 514. For example, a data set with variables 'Months with service,' 'Level of education,' and 'Churn' may contain a customer record ('10,' 'High school,' and 'True'). Thus, the data records of the evaluation data set 514 are partitioned so that each record belongs to a single leaf node in each tree in the tree ensemble.

Once the data records of the evaluation data set 514 have been assigned to the respective leaf nodes of the trees in the tree ensemble, prediction identification logic 504 utilizes the set of evaluation data 514 to determine the predicted value defined by the whole tree ensemble. During this process, for each record in the set of evaluation data 514, prediction identification logic 504 identifies the corresponding leaf node in each tree in the tree ensemble. Prediction identification logic 504 then identifies the prediction associated with each identified leaf node to the record. An example of a prediction may be (THEN) 'churn' at the end, if the path to that leaf node is taken. Once all of the predictions associated with the leaf nodes to which the record is assigned are identified, prediction identification logic 504 determines a prediction of the tree ensemble by combining the predictions from respective leaf nodes. This process is repeated for each record in the set of evaluation data 514.

Since predicted target values may be determined as the most frequent target category for categorical target or the mean for continuous target across all target values in the leaf node, corresponding decision rules may comprise variables and constraints on the path to the leaf node as well as the predicted target value. Therefore, utilizing the determined predicted values, sub-index determination logic 506 determines interesting sub-indices for all decision rules corresponding to all the leaf nodes in the tree ensemble, the sub-indices being: an agreement between a decision rule and the ensemble prediction, an interestingness of the decision rule accuracy, and an accuracy of the ensemble prediction.

With regard to categorical targets, in order to determine the agreement between a decision rule and the ensemble prediction, the interestingness of the decision rule accuracy, and the accuracy of the ensemble prediction, for each leaf node t in the tree ensemble, sub-index determination logic 506 identifies a proportion of data records $P(R(t))$ determined by the leaf node t where the decision rule is accurate, $R(t)$ being the event that the prediction of the decision rule based on the node t (e.g. the most frequent target category is predicted) is accurate. Sub-index determination logic 506 identifies a proportion of data records $P(E(t))$ determined by the leaf node t where the tree ensemble model is accurate, $E(t)$ being the event that the ensemble prediction is accurate based on a data record determined by node t. Thus, the proportion $P(\overline{E}(t))$ of the event $\overline{E}(t)$ that the ensemble prediction is inaccurate based on a data record determined by node t is defined by $P(\overline{E}(t))=1-P(E(t))$. Sub-index determination logic 506 further identifies a proportion of data records $P(E(t)R(t))$ determined by the node t that are predicted accurately by both the ensemble model and the decision rule as well as a proportion of data records $P(\overline{E}(t)\overline{R}(t))$ determined by the node t that are predicted inaccurately by both the ensemble model and the decision rule.

Utilizing the identified values, sub-index determination logic 506 determines the first sub-index of interestingness based on prediction agreement between the ensemble model and the decision rule as $I_1^t = P(E(t)R(t)) + P(\overline{E(t)}\overline{R(t)})$. Sub-index determination logic 506 determines the second sub-index of interestingness on the decision rule accuracy as $I_2^t = P(R(t))$. Sub-index determination logic 506 determines the third sub-index of interestingness on the ensemble model accuracy as $I_3^t = P(E(t))$.

It should be noted that, in order to make the decision rules more representative, each leaf node should have a reasonable number of records. Implementation of a requirement for each leaf node to have a predetermined number of records may be applied by, for example, excluding leaf nodes with records under a predetermined threshold. Another example may be to collapse small leaf nodes into their parent nodes so that larger collapsed leaf nodes may be obtained.

The concept of probability as described above is used to derive the interestingness index for categorical targets; however, probability is not suitable for regression models where the target is continuous. Thus, the illustrative embodiments provide different mechanism to evaluate the interestingness of decision rules for continuous targets. Per conformance requirement of the ensemble model and the decision rule, predictions from the ensemble model and the decision rule are expected to be as similar as possible. This may be quantified by several measures based on prediction differences on data records determined by the leaf node t. Typical measures include mean square error and mean absolute error. Smaller measure values signify improved conformance between the ensemble and the decision rule.

However, the main shortcoming of these measures is that they depend on the scale of the target variable. Thus, it is necessary to standardize the used measure in order to obtain useful interestingness sub-index which ranges in values between 0 and 1. One embodiment of standardizing strategy is to divide the measure value for each leaf node by the corresponding mean or median of measure values across all leaf nodes. For the leaf nodes with large measure values, the standardized measure value D(t) could be larger than 1. The standardized measure is the ratio of the measure value (mean square error or mean absolute error) for the leaf node and the corresponding mean or median of measure values across all leaf nodes. For such leaf nodes, the measure value is simply truncated at 1. Given the standardized measure value D(t), sub-index determination logic 506 determines the first sub-index of interestingness between a decision rule and the ensemble prediction based on the conformance requirement as $I_1^t = 1 - D(t)$. For the second sub-index of interestingness on the decision rule predictions, sub-index determination logic 506 considers the decision rules that predict either high or low values of the target variable to be the most interesting. This may be achieved by comparing each decision rule predictions with the root node predictions.

One embodiment utilizes two independent samples t-test for the comparison of the decision rules based on a leaf node and the root node. A decision rule is considered to be more interesting if its prediction distribution is more significantly different from the root node predictions. Moreover, sub-index determination logic 506 determines an effect size measure corresponding to the t-test, and transforms the effect size measure into an interestingness sub-index with values between 0 and 1. Sub-index determination logic 506 may use appropriate interpolation methods, such as, for example, assuming that the p-value from the t-test is $p_{value}(t)$, the effect size measure is $E_s(t)$, and a monotone cubic interpolation function is f(x). P-value is a function of the observed t-test statistic that tests hypothesis of no difference in mean of the target variable values between the root node and the leaf node. Effect size measure is a quantitative measure of the strength of the difference of the mean of the target variable values between the root node and the leaf node. Then, sub-index determination logic 506 defines the second sub-index of interestingness of the decision rule accuracy as:

$$I_2^t = \begin{cases} 0, & p_{vlaue}(t) \geq sig \\ f(E_s(t)), & p_{vlaue}(t) < sig \end{cases}$$

where sig is the specified significance level (default 0.05).

The third sub-index of interestingness is an indicator of the ensemble model accuracy. A fairly straightforward choice is for sub-index determination logic 506 to determine an R squared metric for the ensemble model on data records determined by the leaf node t. Sub-index determination logic 506 determines R squared as 1 minus the relative error, where the relative error is given by the sum of squared errors for the ensemble model divided by the total sum of squares. R squared has values between 0 and 1, where 1 indicates a perfect fit. Sub-index determination logic 506 therefore specifies the third sub-index of interestingness for accuracy of the ensemble model prediction to be $I_3^t = R^2(t)$.

Once the agreement between a decision rule and the ensemble prediction $I_1^t$, the interestingness of the decision rule accuracy $I_2^t$, and the accuracy of the ensemble prediction $I_3^t$ have been determined either for the categorical target or for the continuous target, interestingness determination logic 508 combines the sub-indices into an overall decision rule or interestingness index $I_t$ as the product of sub-indices $I_t = I_1^t \times I_2^t \times I_3^t$. With the interestingness index $I_t$ determined, ranking logic 510 ranks all of the decision rules according to the value of interestingness index from the highest to the lowest value. Reporting logic 512 then sends a report of the those ones of the interesting decision rules 516 according to one or more of a predetermined number of rules, a percentage of the total number of rules, or the decision rules whose interestingness index is above a predetermined threshold.

Thus, the illustrative embodiments provide mechanisms for detecting interesting decision rules in a tree ensemble though an interpretation of predictions from a tree ensemble using concrete decision rules. The mechanisms focus on extracting the most interesting rules that are valuable for users to learn. The wide variety of decision rules provided by the tree ensemble forms a foundation for such an interesting decision rules search.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may he assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart, and/or block diagram block or blocks.

Figure 6:
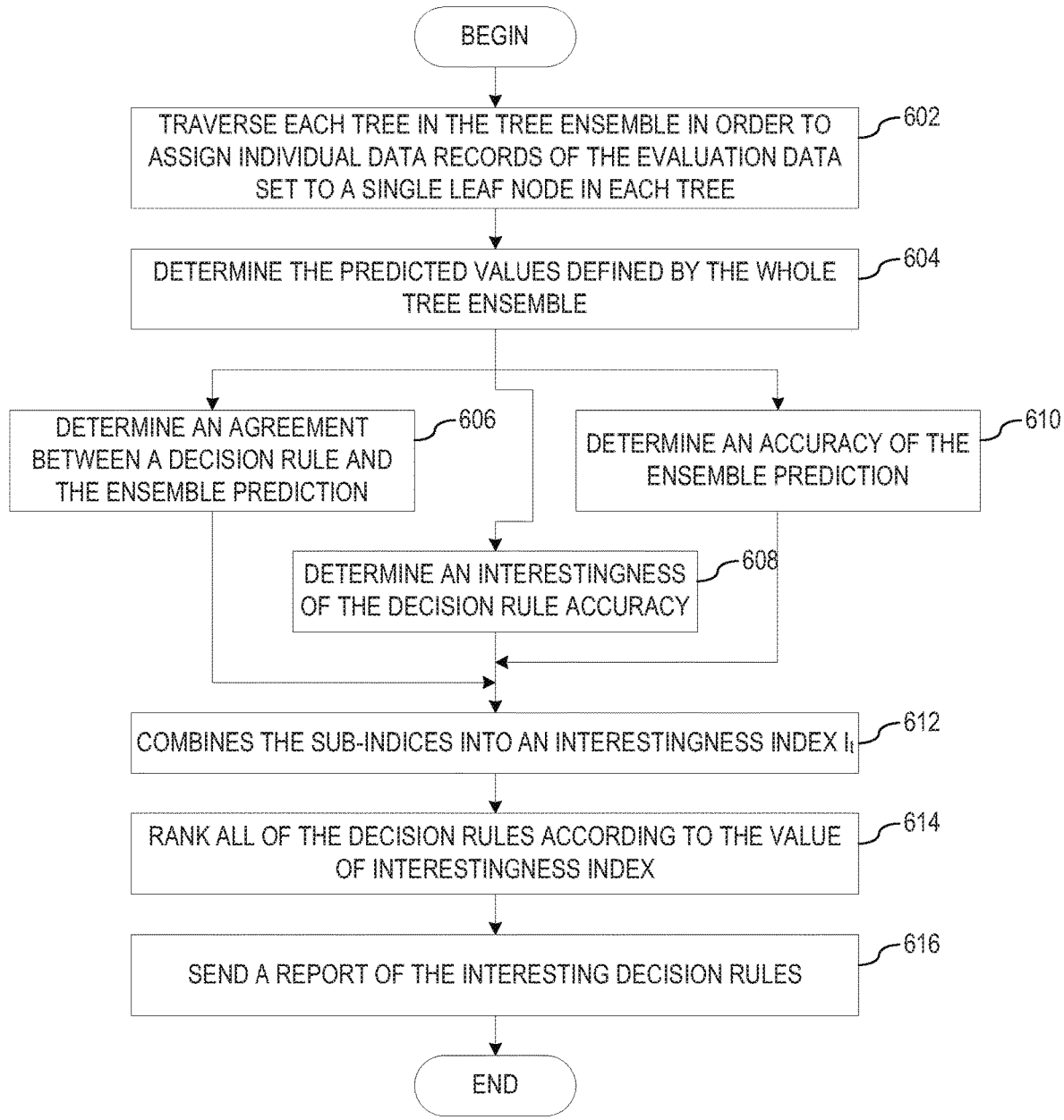
FIG. 6 depicts the operation performed by an interesting decision rules detection mechanism in detecting interesting decision rules in a tree ensemble in accordance with an illustrative embodiment.

FIG. 6 depicts the operation performed by an interesting decision rules detection mechanism in detecting interesting decision rules in a tree ensemble in accordance with an illustrative embodiment. The interesting decision rules detection mechanism utilizes an evaluation data set for assessing both the tree ensemble accuracy and detecting interesting decision rules identified by the leaf nodes of the tree ensemble. As the operation beings, traversal logic in the interesting decision rules detection mechanism uses the evaluation data set to traverse each tree in the tree ensemble in order to assign individual data records of the evaluation data set to a single leaf node in each tree (step 602). This traversal process is described in detail in FIG. 7 that follows.

Once the data records of the evaluation data set have been assigned to the respective leaf nodes of the trees in the tree ensemble, prediction identification logic in the interesting decision rules detection mechanism utilizes the set of evaluation data to determine the predicted values defined by the whole tree ensemble (step 604). This prediction identification process is described in detail in FIG. 8 that follows. Since predicted target values may be determined as the most frequent target category for categorical target or the mean for continuous target across all target values in the leaf node, corresponding decision rules may comprise variables and constraints on the path to the leaf node as well as the predicted target value. Therefore, utilizing the determined predicted values, sub-index determination logic in the interesting decision rules detection mechanism determines interesting sub-indices for all decision rules corresponding to all the leaf nodes in the tree ensemble, the sub-indices being: an agreement between a decision rule and the ensemble prediction (step 606), an interestingness of the decision rule accuracy (step 608), and an accuracy of the ensemble prediction (step 610). Since steps 606, 608, and 610 may be performed in numerous different ways, i.e. for categorical targets or for continuous target, the detail with regard to each of these processes is described in detail in FIGS. 9 and 10, respectively, that follow.

Once the agreement between a decision rule and the ensemble prediction $I_1^r$, the interestingness of the decision rule accuracy $I_2^r$, and the accuracy of the ensemble prediction $I_3^r$ have been determined either for the categorical target or for the continuous target, interestingness determination logic in the interesting decision rules detection mechanism combines the sub-indices into an overall decision rule or interestingness index $I_r$ as the product of sub-indices $I_r = I_1^r \times I_2^r \times I_3^r$ (step 612). With the interestingness index $I_r$ determined, ranking logic in the interesting decision rules detection mechanism ranks all of the decision rules according to the value of interestingness index from the highest to the lowest value (step 614). Reporting logic in the interesting decision rules detection mechanism then sends a report of those ones of the interesting decision rules according to one or more of a predetermined number of rules, a percentage of the total number of rules, or the decision rules whose interestingness index is above a predetermined threshold (step 616), with the operation terminating thereafter.

Figure 7:
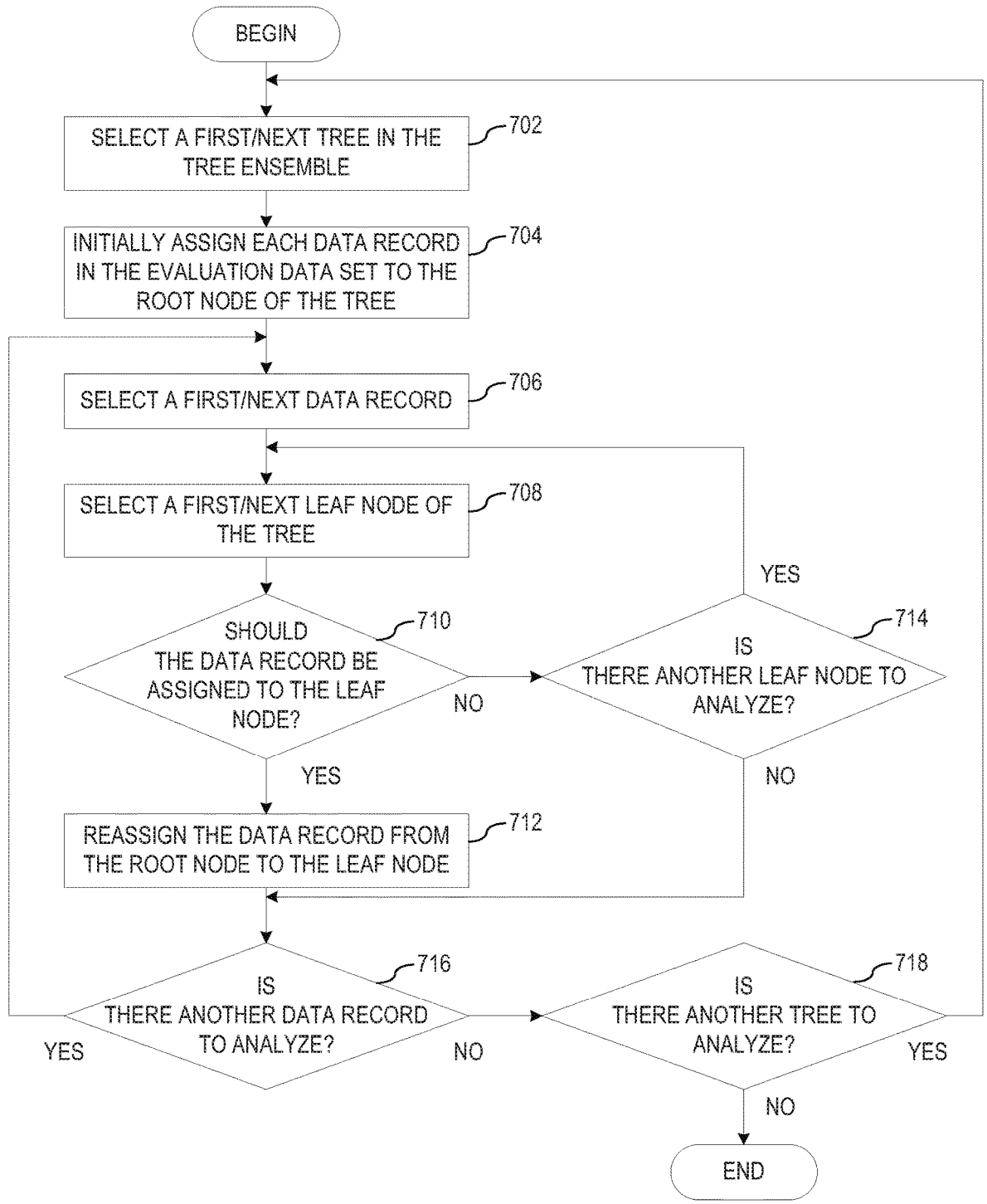
FIG. 7 depicts the operation performed by an interesting decision rules detection mechanism in traversing each tree in the tree ensemble in order to assign data records of the evaluation data set to a single leaf node in each tree in accordance with an illustrative embodiment.

FIG. 7 depicts the operation performed by an interesting decision rules detection mechanism in traversing each tree in the tree ensemble in order to assign data records of the evaluation data set to a single leaf node in each tree in accordance with an illustrative embodiment. As the operation begins, the traversal logic in the interesting decision rules detection mechanism selects a first/next tree in the tree ensemble (step 702) and initially assigns each data record in the evaluation data set to the root node of the tree (step 704). Then, for each data record in the evaluation data set, the traversal logic selects a first/next data record (step 706) and a first/next leaf node of the tree (step 708). The traversal logic determines whether the data record should be assigned to the selected leaf node (step 710). If at step 710 the traversal logic determines that the data record should be assigned to selected leaf node, then the traversal logic reassigns the data record from the root node to the leaf node (step 712). If at step 710 the traversal logic determines that the data record should not be assigned to selected leaf node, then the traversal logic determines if there is another leaf node to analyze (step 714).

If at step 714 the traversal logic determines that there is another leaf node, the operation returns to step 708. If at step 714 the traversal logic determines that there is not another leaf node or from step 712, the traversal logic determines whether there is another data record to analyze (step 716). If at step 716 the traversal logic determines that there is another data record to analyze, the operation returns to step 706. If at step 716 the traversal logic determines that there is not another data record to analyze, the traversal logic determines if there is another tree to analyze (step 718). If at step 718 the traversal logic determines that there is another tree to analyze, the operation returns to step 702. If at step 718 the traversal logic determines that there is not another tree to analyze, the operation terminates. Thus, the data records of the evaluation data set are partitioned so that each data record belongs to a single leaf node in each tree in the tree ensemble.

Figure 8:
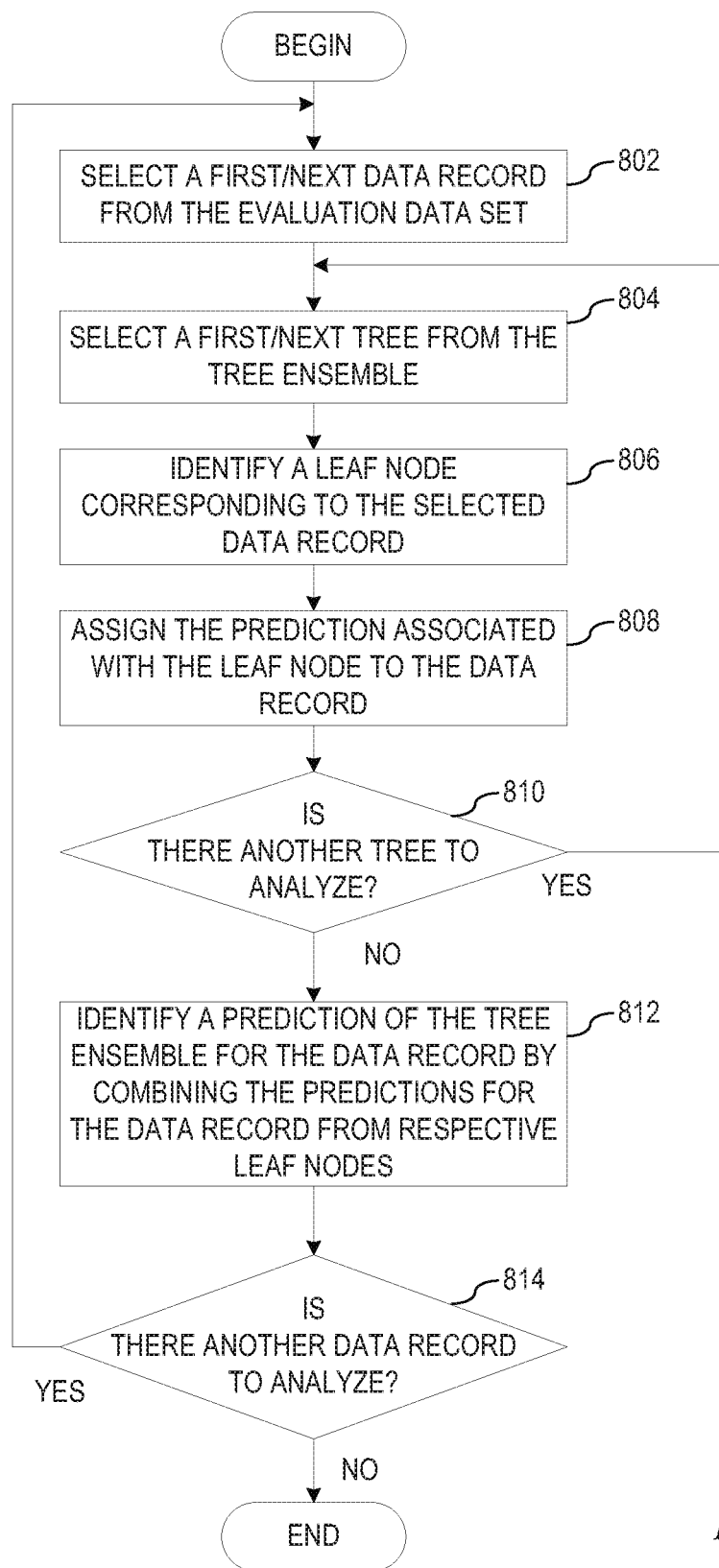
FIG. 8 depicts the operation performed by an interesting decision rules detection mechanism in determining the predicted value defined by the whole tree in accordance with an illustrative embodiment.

FIG. 8 depicts the operation performed by an interesting decision rules detection mechanism in determining the predicted value defined by the whole tree ensemble in accordance with an illustrative embodiment. As the operation begins, the prediction identification logic in the interesting decision rules detection mechanism selects a first/next data record from the evaluation data set (step 802). The prediction identification logic then selects a first/next tree from the tree ensemble (step 804) and identifies a leaf node corresponding to the selected data record (step 806). The prediction identification logic then assigns the prediction associated with the leaf node to the data record (step 808). The prediction identification logic then determines whether there is another tree to analyze (step 810).

If at step 810 the prediction identification logic determines that there is another tree to analyze, then the operation returns to step 804. If at step 810 the prediction identification logic determines that there is not another tree to analyze, the prediction identification logic identifies a prediction of the tree ensemble for the data record by combining the predictions for the data record from respective leaf nodes (step 812). The prediction identification logic then determines whether there is another data record to analyze (step 814). If at step 814 the prediction identification logic determines that there is another data record in the evaluation data set to analyze, then the operation returns to step 802. If at step 814 the prediction identification logic determines that there is not another data record in the evaluation data set tree to analyze, the operation terminates.

Figure 9:
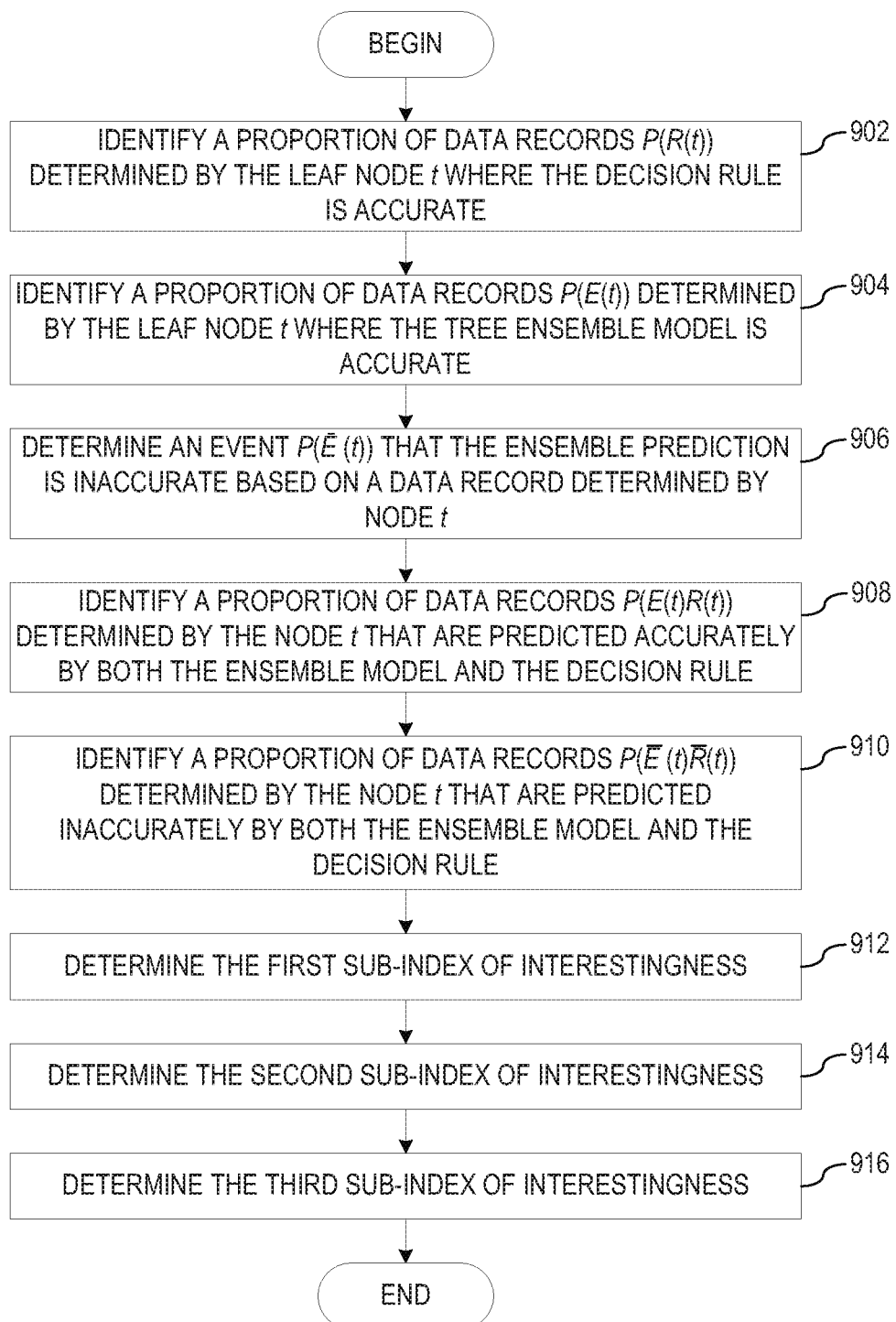
FIG. 9 depicts the operation performed by an interesting decision rules detection mechanism in determining the agreement between a decision rule and the ensemble prediction, the interestingness of the decision rule accuracy, and the accuracy of the ensemble prediction for categorical targets in accordance with an illustrative embodiment.

FIG. 9 depicts the operation performed by an interesting decision rules detection mechanism in determining the agreement between a decision rule and the ensemble prediction, the interestingness of the decision rule accuracy, and the accuracy of the ensemble prediction for categorical targets in accordance with an illustrative embodiment. As the operation begins, sub-index determination logic in the interesting decision rules detection mechanism identifies a proportion of data records $P(R(t))$ determined by the leaf node t where the decision rule is accurate, $R(t)$ being the event that the decision rule based on the node t (step 902) is accurate. The sub-index determination logic identifies a proportion of data records $P(E(t))$ determined by the leaf node t where the tree ensemble model is accurate, $E(t)$ being the event that the ensemble prediction is accurate based on a data record determined by node t (step 904). The sub-index determination logic then determines an event $P(\overline{E}(t))$ that the ensemble prediction is inaccurate based on a data record determined by node t by defining $P(\overline{E}(t))=1-P(E(t))$ (step 906). The sub-index determination logic further identifies a proportion of data records $P(E(t)R(t))$ determined by the node t that are predicted accurately by both the ensemble model and the decision rule (step 908) as well as a proportion of data records $P(\overline{E}(t)\overline{R}(t))$ determined by the node t that are predicted inaccurately by both the ensemble model and the decision rule (step 910).

Utilizing the identified values, the sub-index determination logic determines the first sub-index of interestingness $I_1^t$ based on prediction agreement between the ensemble model and the decision rule as $I_1^t=P(E(t)R(t))+P(\overline{E}(t)\overline{R}(t))$ (step 912). The sub-index determination logic determines the second sub-index of interestingness $I_2^t$ on the decision rule accuracy as $I_2^t=P(R(t))$ (step 914). Finally, the sub-index determination logic determines the third sub-index of interestingness $I_3^t$ on the ensemble model accuracy as $I_3^t=P(E(t))$ (step 916), with the operation terminating thereafter. It should be noted that, in order to make the decision rules more representative, each leaf node should have a reasonable number of records. Implementation of a requirement for each leaf node to have a predetermined number of records may be applied by, for example, excluding leaf nodes with records under a predetermined threshold. Another example may be to collapse small leaf nodes into their parent nodes so that larger collapsed leaf nodes may be obtained.

Figure 10:
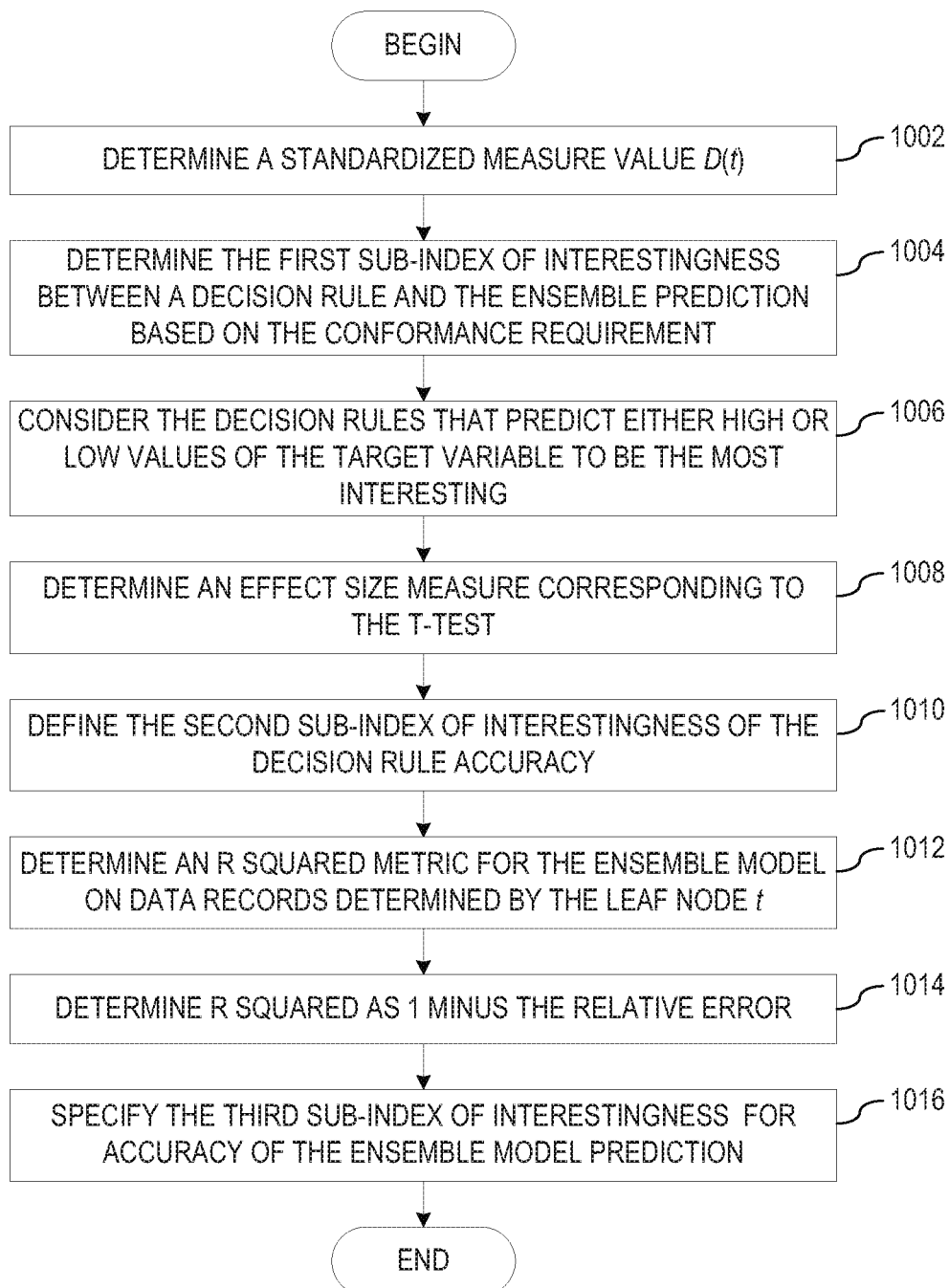
FIG. 10 depicts the operation performed by an interesting decision rules detection mechanism in determining the agreement between a decision rule and the ensemble prediction, the interestingness of the decision rule accuracy, and the accuracy of the ensemble prediction for continuous targets in accordance with an illustrative embodiment.

FIG. 10 depicts the operation performed by an interesting decision rules detection mechanism in determining the agreement between a decision rule and the ensemble prediction, the interestingness of the decision rule accuracy, and the accuracy of the ensemble prediction for continuous targets in accordance with an illustrative embodiment. Per conformance requirement of the ensemble model and the decision rule, predictions from the ensemble model and the decision rule are expected to be as similar as possible. This may be quantified by several measures based on prediction differences on data records determined by the leaf node t. Typical measures include mean square error and mean absolute error. Smaller measure values signify improved conformance between the ensemble and the decision rule. However, the main shortcoming of these measures is that they depend on the scale of the target variable. Thus, it is necessary to standardize the used measure in order to obtain useful interestingness sub-index which ranges in values between 0 and 1, One embodiment of standardizing strategy is to divide the measure value for each leaf node by the corresponding mean or median of measure values across all leaf nodes. For the leaf nodes with large measure values, the standardized measure value could be larger than 1. For such leaf nodes, the measure value is simply truncated at 1. Thus, as the operation begins, the sub-index determination logic determines a standardized measure value D(t) (step 1002). The sub-index determination logic determines the first sub-index of interestingness $I_1^t$ between a decision rule and the ensemble prediction based on the conformance requirement as $I_1^t=1-D(t)$ (step 1004).

For the second sub-index of interestingness $I_2^t$ on the decision rule predictions, the sub-index determination logic considers the decision rules that predict either high or low values of the target variable to be the most interesting (step 1006). This may be achieved by comparing each decision rule predictions with the root node predictions. One embodiment utilizes two independent samples t-test for the comparison of the decision rules based on a leaf node and the root node. A decision rule is considered to be more interesting if its prediction distribution is more significantly different from the root node predictions. Moreover, the sub-index determination logic determines an effect size measure corresponding to the t-test, and transforms the effect size measure into an interestingness sub-index with values between 0 and 1 (step 1008). The sub-index determination logic may use appropriate interpolation methods, such as, for example, assuming that the p-value from the t-test is $p_{value}(t)$, the effect size measure is $E_s(t)$, and a monotone cubic interpolation function is f(x). Then, the sub-index determination logic defines the second sub-index of interestingness of the decision rule accuracy as:

$$I_2^t = \begin{cases} 0, & p_{vlaue}(t) \geq sig \\ f(E_s(t)), & p_{vlaue}(t) < sig \end{cases}$$

where sig is the specified significance level (default 0.05) (step 1010).

The third sub-index of interestingness $I_3^t$ is an indicator of the ensemble model accuracy. The sub-index determination logic determines an R squared metric for the ensemble model on data records determined by the leaf node t (step 1012). The sub-index determination logic determines R squared as 1 minus the relative error, where the relative error is given by the sum of squared errors for the ensemble model divided by the total sum of squares (step 1014). R squared has values between 0 and 1, where 1 indicates a perfect fit. The sub-index determination logic then specifies the third sub-index of interestingness $I_3^t$ for accuracy of the ensemble model prediction to be $I_3^t=R^2(t)$ (step 1016), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In sonic alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions, Thus, the illustrative embodiments provide mechanisms for detecting interesting decision rules in tree ensembles. That is, the mechanisms detect decision rules that are interesting, that conform to the ensemble predictions, and where ensemble predictions are accurate. Interestingness is considered to be high prediction accuracy for categorical targets and high difference from the overall average for continuous targets. Candidate decision rules are based on the leaf nodes of generated trees in the ensemble and novel metrics are provided that combine interestingness and conformance with ensemble predictions. The top decision rules ranked by the computed metrics are the most interesting rules that are consistent with the ensemble predictions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a computing device, causes the computing device to:

traverse each tree in a tree ensemble in order to assign each individual data record from a set of data records in an evaluation data set to an identified leaf node in a set of leaf nodes in each tree;

determine predicted values defined by the tree ensemble based on predictions provided by each leaf node to which each individual data record is assigned;

determine interesting sub-indices for decision rules from a set of decision rules corresponding to the leaf nodes in the tree ensemble, wherein the computer readable program to determine the interesting sub-indices for decision rules corresponding to the leaf nodes in the tree ensemble for continuous targets further causes the computing device to:

determine a standardized measure value D(t);

determine a first sub-index of interestingness $I_1^t$ between a decision rule and the ensemble prediction based on the conformance requirement as $I_1^t=1-D(t)$;

identify decision rules that predict either high or low values of the target variable to be the most interesting;

determine an effect size measure corresponding to a t-test;

transform the effect size measure into an interestingness sub-index with values between 0 and 1;

define a second sub-index of interestingness $I_2^t$ of the decision rule accuracy as:

$$I_2^t = \begin{cases} 0, & p_{vlaue}(t) \geq sig \\ f(E_s(t)), & p_{vlaue}(t) < sig \end{cases}$$

wherein sig is a specified significance level, $p_{value}(t)$ is a p-value from the t-test, $E_s(t)$ is the effect size measure, and f(x) is a monotone cubic interpolation function;

determine an R squared metric for the ensemble model on data records determined by the leaf node t;

determine R squared as 1 minus the relative error, where the relative error is given by the sum of squared errors for the ensemble model divided by the total sum of squares; and define a third sub-index of interestingness $I_3^t$ for accuracy of the ensemble model prediction to be $I_3^t=R^2(t)$;

for each decision rule corresponding to the leaf nodes in the tree ensemble, combine the sub-indices into interestingness index $I_t$;

rank the decision rules corresponding to the leaf nodes in the tree ensemble according to the associated value of the interestingness index $I_t$; and report a subset of the decision rules corresponding to the leaf nodes in the tree ensemble in order to provide a notification of the interesting decision rules in the tree ensemble.

2. The computer program product of claim 1, wherein the subset of the decision rules corresponding to the leaf nodes in the tree ensemble is at least one of a predetermined number of decision rules, a percentage of the total number of decision rules, or decision rules whose interestingness index $I_t$ is above a predetermined threshold.

3. The computer program product of claim 1, wherein each decision rule in the set of decision rules comprise at least one of variables, constraints, and the predicted target value on a path to the corresponding leaf node.

4. The computer program product of claim 1, wherein the computer readable program to determine the interesting sub-indices for decision rules corresponding to the leaf nodes in the tree ensemble are performed for categorical targets or continuous targets.

5. The computer program product of claim 1, wherein the interestingness index $I_t$ is a product of a first sub-index of interestingness $I_1^t$, a second sub-index of interestingness $I_2^t$, and a third sub-index of interestingness $I_3^t$.

6. An apparatus comprising:

a processor; and a memory coupled to the processor, wherein the memory comprises instructions which, when executed by the processor, cause the processor to:

traverse each tree in a tree ensemble in order to assign each individual data record from a set of data records in an evaluation data set to an identified leaf node in a set of leaf nodes in each tree;

determine predicted values defined by the tree ensemble based on predictions provided by each leaf node to which each individual data record is assigned;

determine interesting sub-indices for decision rules from a set of decision rules corresponding to the leaf nodes in the tree ensemble, wherein the instructions to determine the interesting sub-indices for decision rules corresponding to the leaf nodes in the tree ensemble for continuous targets further cause the processor to:

determine a standardized measure value D(t);

determine a first sub-index of interestingness $I_1^t$ between a decision rule and the ensemble prediction based on the conformance requirement as $I_1^t=1-D(t)$;

identify decision rules that predict either high or low values of the target variable to be the most interesting;

determine an effect size measure corresponding to a t-test;

transform the effect size measure into an interestingness sub-index with values between 0 and 1;

define a second sub-index of interestingness $I_2^t$ of the decision rule accuracy as:

$$I_2^t = \begin{cases} 0, & p_{vlaue}(t) \geq sig \\ f(E_s(t)), & p_{vlaue}(t) < sig \end{cases}$$

wherein sig is a specified significance level, $p_{value}(t)$ is a p-value from the t-test, $E_s(t)$ is the effect size measure, and f(x) is a monotone cubic interpolation function;

determine an R squared metric for the ensemble model on data records determined by the leaf node t;

determine R squared as 1 minus the relative error, where the relative error is given by the sum of squared errors for the ensemble model divided by the total sum of squares; and define a third sub-index of interestingness $I_3^t$ for accuracy of the ensemble model prediction to be $I_3^t=R^2(t)$;

for each decision rule corresponding to the leaf nodes in the tree ensemble, combine the sub-indices into interestingness index $I_t$;

rank the decision rules corresponding to the leaf nodes in the tree ensemble according to the associated value of the interestingness index $I_t$; and report a subset of the decision rules corresponding to the leaf nodes in the tree ensemble in order to provide a notification of the interesting decision rules in the tree ensemble.

7. The apparatus of claim 6, wherein the subset of the decision rules corresponding to the leaf nodes in the tree ensemble is at least one of a predetermined number of decision rules, a percentage of the total number of decision rules, or decision rules whose interestingness index $I_t$ is above a predetermined threshold.

8. The apparatus of claim 6, wherein each decision rule in the set of decision rules comprise at least one of variables, constraints, and the predicted target value on a path to the corresponding leaf node.

9. The apparatus of claim 6, wherein the instructions to determine the interesting sub-indices for decision rules corresponding to the leaf nodes in the tree ensemble are performed for categorical targets or continuous targets.

10. The apparatus of claim 6, wherein the interestingness index $I_t$ is a product of a first sub-index of interestingness $I_1^t$, a second sub-index of interestingness $I_2^t$, and a third sub-index of interestingness $I_3^t$.

* * * * *